United States Patent [19]

Hartl

[11] Patent Number: 4,591,432

[45] Date of Patent: May 27, 1986

[54] SIEVING APPARATUS

[76] Inventor: Franz Hartl, A-4482 Ennsdorf, Austria

[21] Appl. No.: 619,031

[22] Filed: Jun. 11, 1984

[30] Foreign Application Priority Data

Jan. 26, 1984 [AT] Austria .................................. 252/84

[51] Int. Cl.[4] .......................... B65G 21/14; B07B 1/46

[52] U.S. Cl. .................................... 209/247; 209/421; 198/313

[58] Field of Search ............... 209/421, 420, 241, 247; 198/313, 314, 317, 315, 302, 632

[56] References Cited

U.S. PATENT DOCUMENTS

| | | | |
|---|---|---|---|
| 2,538,308 | 1/1951 | Grahl | 198/313 |
| 2,632,556 | 3/1953 | Alpers et al. | 198/313 |
| 2,812,867 | 11/1957 | Anderson | 198/632 |
| 2,815,853 | 12/1957 | Likens | 198/313 |
| 2,922,510 | 1/1960 | Zetterlund | 209/241 |
| 3,493,136 | 2/1970 | Spellman | 198/313 |
| 3,722,477 | 3/1973 | Weldy et al. | 198/313 |
| 4,058,198 | 11/1977 | O'Niell et al. | 198/313 |
| 4,190,526 | 2/1980 | Bachand | 209/421 |
| 4,303,506 | 12/1981 | Finlay | 209/247 |

FOREIGN PATENT DOCUMENTS

| | | | |
|---|---|---|---|
| 2009076 | 6/1976 | United Kingdom | 198/302 |

*Primary Examiner*—Frank W. Lutter
*Assistant Examiner*—William Bond
*Attorney, Agent, or Firm*—Karl F. Ross; Herbert Dubno

[57] ABSTRACT

In sieving apparatus, an undercarriage carries a belt conveyor, which has a frame that is adapted to be folded in length about a hinge. The belt conveyor carries at its discharge end a sieving machine, which is adapted to be driven and which has an adjustable inclination relative to the belt conveyor. Hydraulic cylinder-piston units are provided for adjusting the inclination of the sieve and for pivotally adjusting the pivotally movable section of the conveyor belt frame. The sieving machine is adapted to be swung against that side of the adjacent section of the conveyor belt frame which faces downwardly when the apparatus is in operating position. As a result, when the apparatus is entirely collapsed the upper section of the conveyor belt frame extends above and along the lower section of said frame and the sieving machine is disposed above the upper section of said frame.

4 Claims, 3 Drawing Figures

SIEVING APPARATUS

SPECIFICATION FIELD OF THE INVENTION

This invention relates to sieving apparatus comprising a belt conveyor, which is mounted on an undercarriage and has a frame that is adapted to be longitudinally folded about a hinge, and a sieving machine which is disposed at the discharge end of the belt conveyor and adapted to be driven and has an inclination that is adjustable about a transverse axis disposed adjacent to the belt conveyor.

BACKGROUND OF THE INVENTION

Sieving apparatus of this kind are used in large sieving plants. Because the conventional belt conveyors are too long for normal travel, the frame of the belt conveyor is divided in length so that the belt conveyor can be folded in length. In previous practice, this has been effected by hand after corresponding struts and locking means have been released. For this purpose a plurality of workers are required when the sieving apparatus is to be collapsed and erected and the operators must handle heavy weights during such work. Besides, the collapsing and erecting of the apparatus takes considerable time.

The sieving machine must be pivotally adjustable so that the parting size and the residence time of the solids on the sieve can be adjusted. That adjustment has previously been effected by an adjustment of the length of struts. The sieving machine has a considerable weight, which must also be handled by the operators when the belt conveyor is being collapsed and when the sieving machine is to be reerected. A re-adjustment of the inclination during operation is complicated and time-consuming.

In most cases the belt conveyor is supported on the ground during operation by means of additional struts, which must be extended. The operation of said struts is also time-consuming and involves heavy manual work.

OBJECT OF THE INVENTION

It is an object of the invention to provide sieving apparatus which is of the kind described first hereinbefore and can be erected and brought into a condition for travel with little manual work and which permits an adjustment of the inclination of the sieving machine also during operation and which when the belt conveyor has been collapsed has a small bulk, particularly a low center of gravity, and a desirable arrangement of the undercarriage.

SUMMARY OF THE INVENTION

The object set forth is basically accomplished in that hydraulic cylinder-piston units are provided for the adjustment of the inclination of the sieve and for the pivotal adjustment of the pivotally movable section of the belt conveyor frame, that the cylinder-piston unit for adjusting the sieve is preferably pivoted to the pivotally movable section of the belt conveyor frame and is operable to swing the sieve to a position in which it extends along the underside of that section of the conveyor frame, the cylinder-piston units for adjusting the pivotally movable section of the belt conveyor frame are pivoted to the lower section of the belt conveyor frame, links are provided, which are pivoted to the two sections of the belt conveyor frame on opposite sides of the hinge connecting said sections and which when the belt conveyor frame is extended constitute two sides of a triangle having an upwardly directed apex, and the cylinder-piston units for adjusting the pivotally movable section of the belt conveyor frame are pivoted to said links adjacent to said apex. The basic concept of the invention is to use hydraulic cylinder-piston units for the actuation of the heavy parts which are to be adjusted relative to each other. During the folding of the belt conveyor, the belt can be prevented from falling out of its tracks on the inside of the hinge in that means for retaining the belt are provided adjacent to the hinge. The operating position of the sieving machine can be adjusted by means of the hydraulic cylinder-piston units even during operation. If the pivotally movable section of the belt conveyor frame is pivotally adjusted in the preferred manner by means of links which constitute sides of a triangle, the resulting arrangement will have a simple configuration and will be reliable in operation. The pivots can be so arranged that when the appliance has been collapsed the cylinder-piston units will extend alongside the stack consisting of the two conveyor belt frame sections and the sieving machine.

In accordance with a further feature the undercarriage consists of a one-axle undercarriage and by means of struts, which are pivoted to the lower section of the belt conveyor near the hinge of the belt conveyor frame, is pivotally movable from an operating position, in which the struts protrude from the belt conveyor substantially at right angles thereto, toward the lower end of the belt conveyor in an operation in which the normal distance from the undercarriage to the belt conveyor is decreased, hydraulic cylinder-piston units are provided for that pivotal movement of the undercarriage and the latter is adapted to be fixed in both positions relative to the belt conveyor, particularly the frame thereof.

To facilitate the folding of the belt, the latter is preferably relieved from tension. This is facilitated in that the belt conveyor is adapted to be driven by a rotary hydraulic motor, which is disposed at the upper end of the conveyor and together with the upper drive pulley is adjustable along the conveyor by hydraulic cylinder-piston units for tensioning the conveyor belt and for relieving it from tension.

If the wheels of the undercarriage are provided with tires of conventional width or extra-wide tires, the wheels of the undercarriage may be used to support the sieving apparatus during operation. This will result in the special advantage that any vibration occurring during operation will be softly cushioned and will not result in wear or loud noise.

The hydraulic cylinder-piston units for adjusting the struts may be directly connected to the struts. Alternatively, the free end of the lower section of the belt conveyor may constitute a supporting foot, which together with the undercarriage supports the sieving apparatus in operating position, and additional struts may be provided, which are disposed between the undercarriage and the supporting foot and are adapted to be hydraulically lowered from the conveyor belt, specifically from its frame, onto the ground and adapted to be used to raise the belt conveyor, particularly when it is collapsed, to a position in which the undercarriage is pivotally movable and in which the wheels of the undercarriage are preferably also clear of the ground. In that case the two positions between which the undercarriage is pivotally movable may be selected to lie on opposite sides of a dead center position of the undercarriage so that it is sufficient to provide stops for arresting the undercarriage in respective overcenter positions.

In accordance with a further feature, a platform for supporting supply and distributing means for the apparatus, particularly for an internal combustion engine and an associated hydraulic pump for supplying fluid to the rotary hydraulic motor and the cylinder-piston units and the associated distributing and control means, is provided below the lower section of the belt conveyor and pivotally movable about a pivot which is mounted near the lower end of the lower section of the belt conveyor frame and in the operating position of the apparatus said platform is secured to holders, which are connected to the frame of the belt conveyor, and is adapted to be coupled to the additional struts so that when it has been disconnected from the holders the platform can be raised and lowered by means of the additional struts. The platform and the units carried by the platform are readily accessible for being serviced when the platform has been swung down.

BRIEF DESCRIPTION OF THE INVENTION

The invention is illustrated in the drawing, in which.

SPECIAL DESCRIPTION

Figure 1:
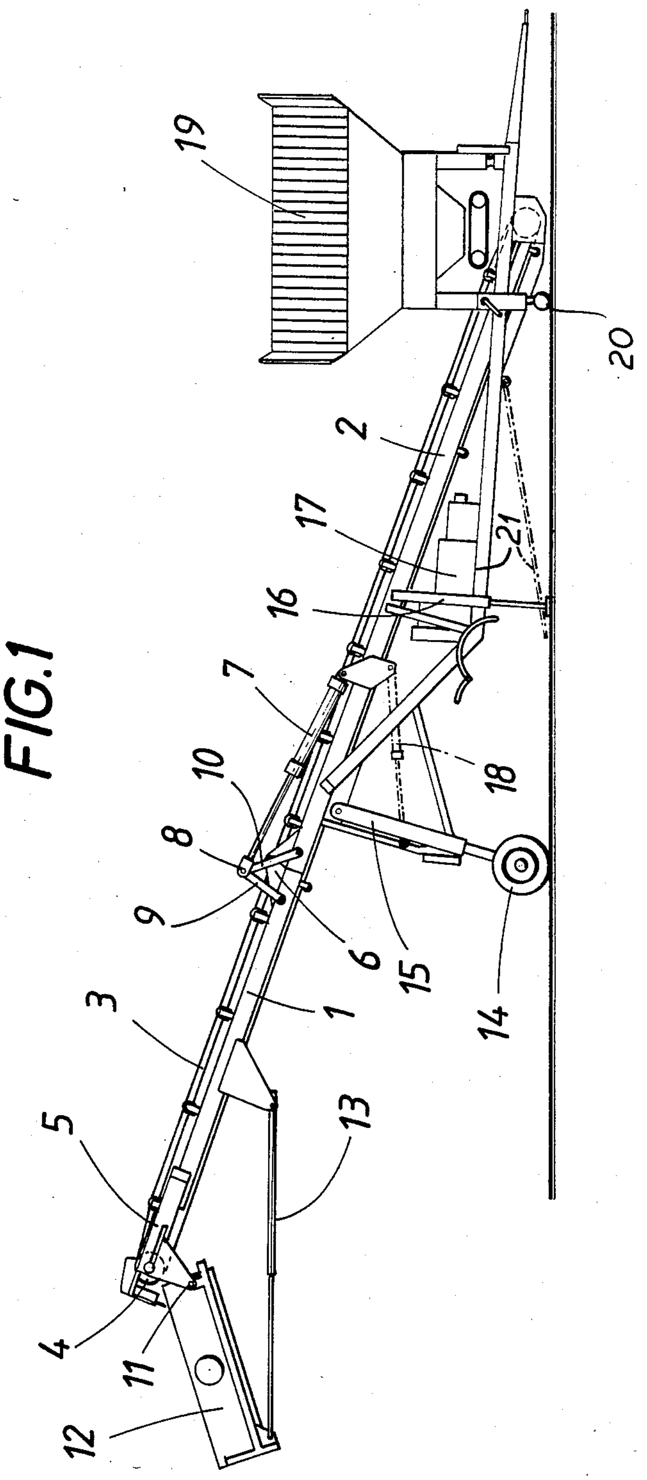
FIG. 1 is a side-elevational view showing the screening apparatus of the invention in its unfolded position.
Figure 3:
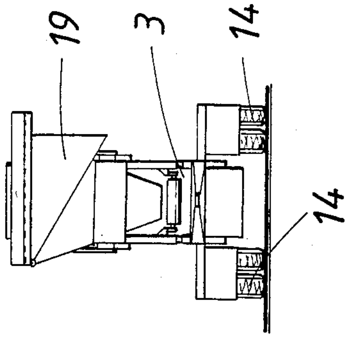
FIG. 3 is an end view of the apparatus.

The sieving apparatus is shown in FIG. 1 in side elevation in its operating position and comprises a conveyor belt 3, which is mounted on a frame 1, 2 and adjacent to the top end of the upper section 1 of the belt conveyor frame is trained around a reversing pulley 4, which is adapted to be driven by a rotary hydraulic motor and together with said motor is mounted on a slide 5, which is adjustable along the belt conveyor frame by means of hydraulic cylinder-piston units.

Figure 2:
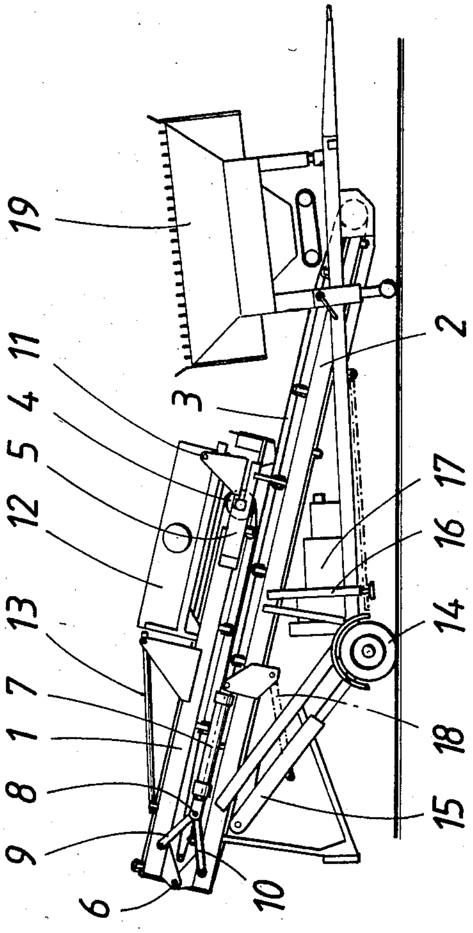
FIG. 2 is a side-elevational view showing the screening apparatus of the invention in a folded position.

The upper and lower sections of the belt conveyor frame are interconnected by a hinge 6. The upper section 1 of the belt conveyor frame is pivotally movable about the hinge to the position shown in FIG. 2, in which the upper section 1 extends close to and along the lower section 2 of the belt conveyor frame. For this purpose, hydraulic cylinder-piston units 7 are provided on opposite sides of the lower section 1 of the belt conveyor frame and at one end are pivoted to the lower section 2 of the belt conveyor frame and at the other end are connected to a hinge 8 provided between two links 9, 10, which constitute two sides of a triangle. One link 9 is pivoted to the upper section 1 of the belt conveyor frame at a distance from the hinge 6. The other link 10 is pivoted to the lower section 2 of the belt conveyor frame at a distance from the hinge. Retaining means, not shown, may be provided adjacent to the hinge 6 in order to prevent the belt 3 from leaving the frame as the latter is collapsed.

A sieving machine 12 is pivoted to the upper end portion of the upper section 2 of the conveyor belt frame by means of a hinge 11. That sieving machine 12 comprises a sieve, which is adapted to be driven so as to vibrate in a transverse direction, and a motor for driving said sieve. A hydraulic cylinder-piston unit 13 is provided for pivotally adjusting the sieving machine and is pivoted to the upper section 1 of the belt conveyor frame and detachably connected to the sieving machine 12 and is operable to move the sieving machine 12 to the position shown in FIG. 2, in which the sieving machine 12 extends close to and along that side of the upper section 2 of the conveyor belt frame which faces downwardly when the sieving apparatus is in operating position.

The lower end of the lower section 2 of the belt conveyor frame constitutes a supporting foot 20, which together with the wheels 14 of an undercarriage 14, 15 supports the sieving apparatus in its operating position. Adjacent to the lower end of the lower section 2 of the conveyor belt there is also a hitch, by which the sieving apparatus can be coupled to a towing vehicle.

The wheels 14 are carried by struts 15, which are pivoted to the lower section 2 of the belt conveyor frame adjacent to the hinge 6 and which in the operating position shown in FIG. 1 are in an overcenter position. When the apparatus has been moved to the position in which the upper section 1 of the belt conveyor frame and the sieve 12 are infolded, the additional struts 16 are hydraulically extensible to raise the apparatus about the supporting foot at the lower end of the lower section of the belt conveyor frame. Thereafter the struts 15 of the undercarriage are movable from said overcenter position beyond the dead center position to a travel position, in which the wheels 14 are nearer to the conveyor belt and nearer to the lower end of the lower section of the conveyor belt frame and support the collapsed apparatus under its center of gravity.

A platform 21 is disposed below the lower section 2 of the belt conveyor frame and carries an internal combustion engine 17, a hydraulic pump driven by said engine, and distributing and control means associated therewith and is held to the belt conveyor frame by straps. That platform is pivoted at its end that is disposed near the lower end of the belt conveyor frame and is adapted to be coupled to the additional struts 16 so that when the connection to the straps has been eliminated the platform can be swung down to a servicing position, in which the units carried by the platform are readily accessible.

The pivotal movement of the struts 15 to the two end positions could also be effected by cylinder-piston units 18 which are directly connected to the struts 15.

A feed hopper 19, which may be provided with a vibrator, is shown at the lower end of the belt conveyor.

What is claimed is:

1. In sieving apparatus comprising:

an undercarriage, a belt conveyer having a frame comprising first and second frame sections and a hinge connecting said first and second frame sections at a hinge axis, said first frame section being pivotally movable about said hinge from an operating position in which said frame is extended to a travel position in which said first frame section extends close to and along said second frame section above the latter, said first frame section having a free end remote from said hinge which constitutes a discharge end of said conveyer, and a sieving machine comprising a sieve which is adapted to be driven and is pivoted to said first frame section near said discharge end on an axis which is transverse to the longitudinal direction of said frame, the improvement residing in that first hydraulic cylinder-piston means are provided for pivotally moving said sieve about said transverse axis, second hydraulic cylinder-piston means are provided for moving said first frame section about said hinge between said operating position and said travel position, first and second links are provided, each of which has first and second ends, said first and second links being pivoted at their first ends to said first and second frame sections, respectively, at a distance from said hinge, and being pivoted to each other at their second ends which are disposed above said second frame section, and said second cylinder-piston means are pivoted at one end to at least one of said first and second links adjacent to said second end thereof and are pivoted at the other end to said second frame section at a location on an opposite side of said first end of said second link across said hinge, said undercarriage consisting of a one-axle undercarriage comprising wheels and struts which carry said wheels are pivoted to said second frame section and pivotally movable about a transverse axis which is parallel to said hinge axis and spaced from an opposite end of said second frame section remote from said hinge and from said hinge, means being provided which define for said struts an upstanding position in which said struts extend substantially at a right angle to said second frame section, and a travel position, in which said wheels are nearer to said second frame section and to said opposite end thereof than when said struts are in said upstanding position, said wheels lying beneath said sieving machine when said sieving machine is swung to overlie said first frame section in said travel position thereof, hydraulic piston-cylinder means being provided for moving said struts between said upstanding and travel positions, said second frame section is formed at the end which is opposite to said hinge to constitute a supporting foot adapted to support said sieving apparatus when said frame is extended, and additional downwardly extending struts are connected to said second frame section between said opposite end and said undercarriage and consist of hydraulic cylinder-piston units which are extensible as far as to the ground and to move said belt conveyer to a position in which said undercarriage is pivotally movable when said first frame section is in said travel position.

2. The improvement set forth in claim 1 wherein a platform is disposed below said second frame section and is hinged to the latter near that end of said second frame section which is opposite to said hinge, said platform carries power supply and distributing means for operation of the sieving apparatus.

3. The improvement set forth in claim 2, wherein said power supply and distributing means comprise a hydraulic pump for supplying hydraulic fluid to said cylinder-piston means and an internal-combustion engine for driving said hydraulic pump.

4. The improvement set forth in claim 3 as applied to sieving apparatus in which said belt conveyor comprises a reversing pulley rotatably mounted in said first frame section near said discharge end, and endless conveyor belt trained around said revering pulley and extending along said first and second frame sections, and a motor for driving said belt, wherein said motor is a rotary hydraulic motor that is coupled to said reversing pulley, a slide is provided, which is mounted on said first frame section near said discharge end and is slidable along said first frame section, said hydraulic pump is operable to supply hydraulic fluid also to said rotary hydraulic motor.

* * * * *